INVENTORS
JOHN ANTONY PENNELL
JOHN CRAWLEY

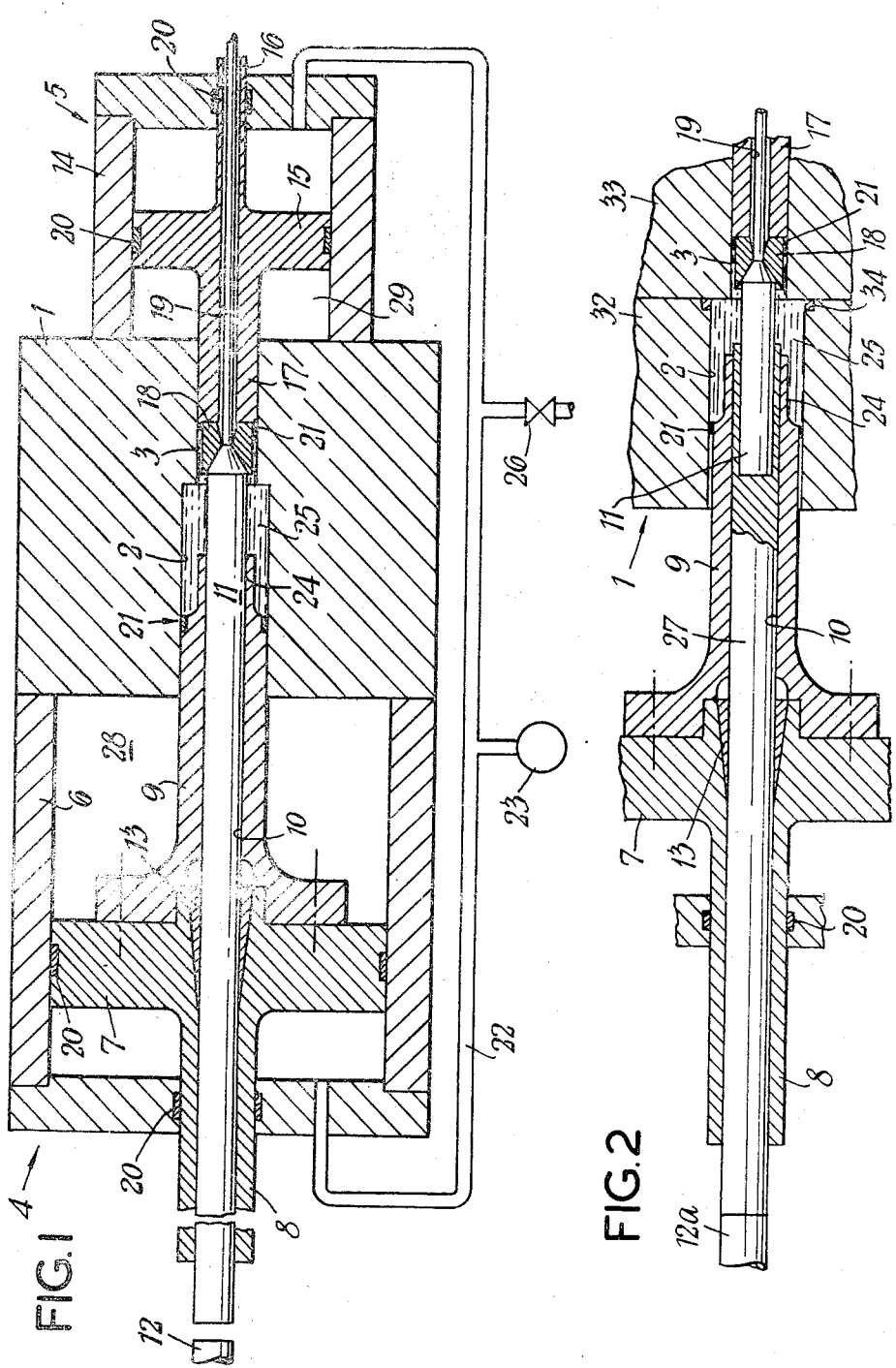

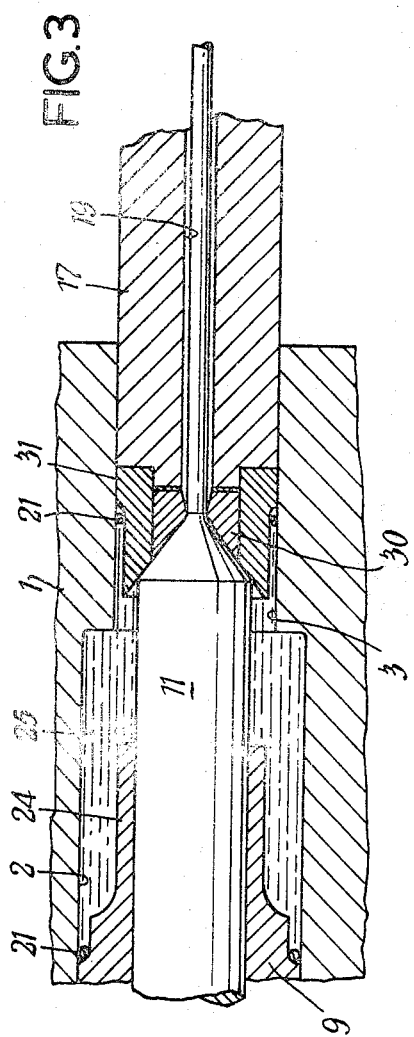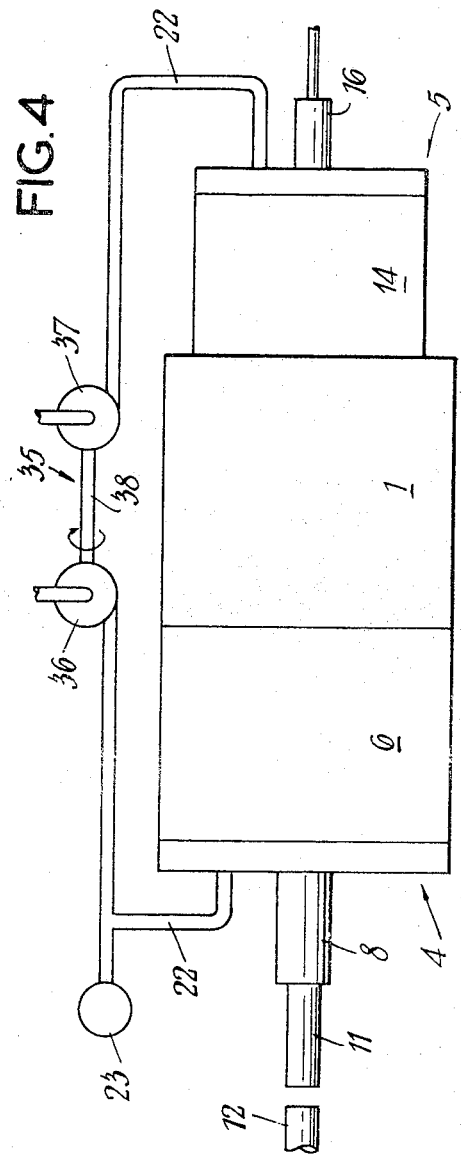

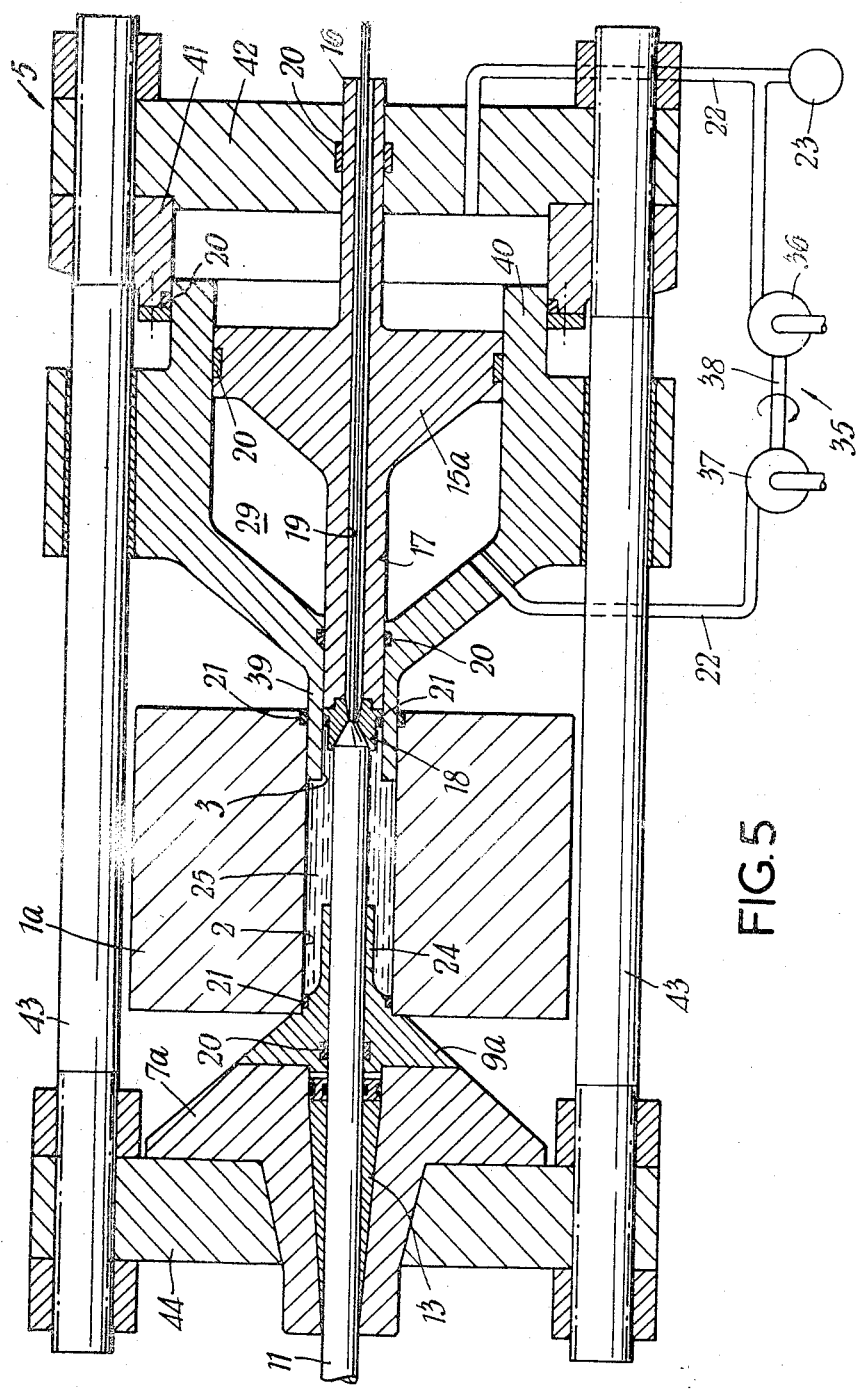

United States Patent Office 3,520,164
Patented July 14, 1970

3,520,164
HIGH PRESSURE EXTRUSION APPARATUS
John Antony Pennell, Cumberland, and John Crawley, Durham County, England, assignors to Vickers Limited, London, England, a British company
Filed Dec. 14, 1967, Ser. No. 690,657
Claims priority, application Great Britain, Dec. 16, 1966, 56,558/66
Int. Cl. B21c 23/08
U.S. Cl. 72—60          9 Claims

ABSTRACT OF THE DISCLOSURE

High pressure extrusion apparatus for hydrostatic or semi-hydrostatic operation incorporating a pressure vessel component having therein an extrusion chamber formed by an open-ended stepped bore therethrough, which step may be provided by a sleeve component fitted in the bore, and to hollow ram components projected into hydrostatic pressure medium in the extrusion chamber, one through each open bore end, a billet to be extruded being clamped in one ram component to project into the extrusion chamber into contact with an extrusion die carried on the inner tip of the other ram components and being extruded through the die and die carrying ram component by axial movement of at least two of said components relative to the other or others.

---

Figure 6:
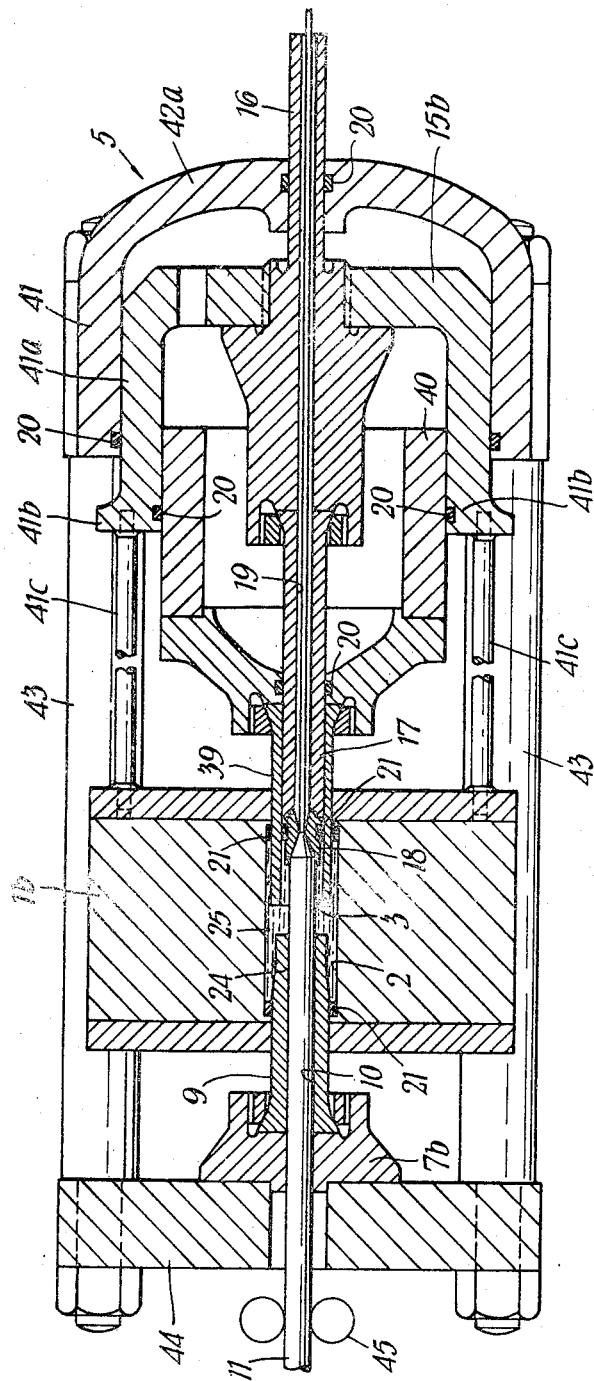

This invention relates to high pressure extrusion apparatus and is concerned with such extrusion apparatus suitbale for hydrostatic or semi-hydrostatic operation.

In the design of commercial hydrostatic extrusion apparatus, difficulty is often experienced in achieving sufficiently long high-pressure seal life. This is partly because in most designs it is necessary to break and remake the main sliding high-pressure seals each time a billet is loaded.

Furthermore it is essential that the billets are handled with extreme care to prevent damage to seals and the high-pressure extrusion vessel, while such vessel must also be charged with hydrostatic pressure medium and bled before each extrusion. Unusually long billets must also be handled and loaded rapidly. All these factors combine to make it extremely difficult to achieve a fast cycling rate.

Where very high pressures are required, it is also most convenient to increase the length of the billet, and hence the length of the required high-pressure extrusion vessel, in order to increase the piece weight. This leads to very long costly vessels, and ram stability problems.

In the past, attempts to overcome these difficulties have resulted in apparatus being developed to allow extrusion of a continuous, or very long billet, which is fed intermittently into the vessel, partly extruded, and the cycle repeated. The systems so far proposed usually involve coiling the billet within the extrusion vessel prior to extrusion, so that a vessel bore much greater than the billet diameter is required. This precludes the extrusion of large-diameter and brittle billets, and aggravates problems associated with controlling the process. The prevention of a "stick-slip" extrusion condition is also made more difficult due to the large volume of high-pressure fluid in the vessel compared with the billet volume. The stored energy per unit billet mass is thus much greater, leading to potentially very high transient extrusion speeds.

A further problem arising in the design of hydrostatic extrusion apparatus involves the removal of discard from the die in the event of incomplete extrusion of the billet. In conventional extrusion, the billet discard at the end of the process is firmly enclosed in the extrusion vessel, and can be easily drawn out of the die by axially separating the die and vessel. After hydrostatic extrusion, on the other hand, this is not possible since the billet is neither upset within the vessel nor gripped by it. It is an object of the present invention to provide for hydrostatically extruding short, long, or continuous billets at a very high pressure and cycling rate without the need to interfere with main high-pressure sliding seals between each cycle. Only a relatively short pressure vessel is required, of bore diameter only slightly greater than that of the billet, and it is not necessary to coil the billet. It is accordingly possible to extrude at high speed, long, large-diameter billets of brittle material from an apparatus of relatively low capital cost. Provision can also be made for extracting a discard from the die, or for extratcing a long partly extruded billet from the vessel without disturbing the main seals. By a simple modification to the hydraulic system, the apparatus can also be adapted to "augmented" or semi-hydrostatic extrusion, in which the extrusion ram exerts a load directly on the billet, in addition to the high hydrostatic fluid pressure, in order to cause it to extrude.

This modification can be made to occur during an extrusion.

Accordingly the invention provides a high pressure extrusion apparatus for hydrostatic or semi-hydrostatic extrusion purposes, said apparatus incorporating a pressure vessel having an open ended axial bore therethrough defining at least one extrusion chamber adapted to contain hydrostatic medium, a first axially bored ram assembly which is arranged for projection into said extrusion chamber through one open bore end of the vessel and from which a billet of material to be extruded can be caused to project into said extrusion chamber, said first ram assembly including clamping means selectively actuable to prevent relative axial movement between the first ram assembly and the billet projected as aforesaid, a second axially bored ram assembly adapted to carry an extrusion die and arranged to project into said extrusion chamber through the other open bore end of the vessel and pressure means operative in the direction of the vessel bore axis to generate a controlled extrusion pressure in hydrostatic medium surrounding a billet part when projected into the extrusion chamber as aforesaid.

Figure 7:
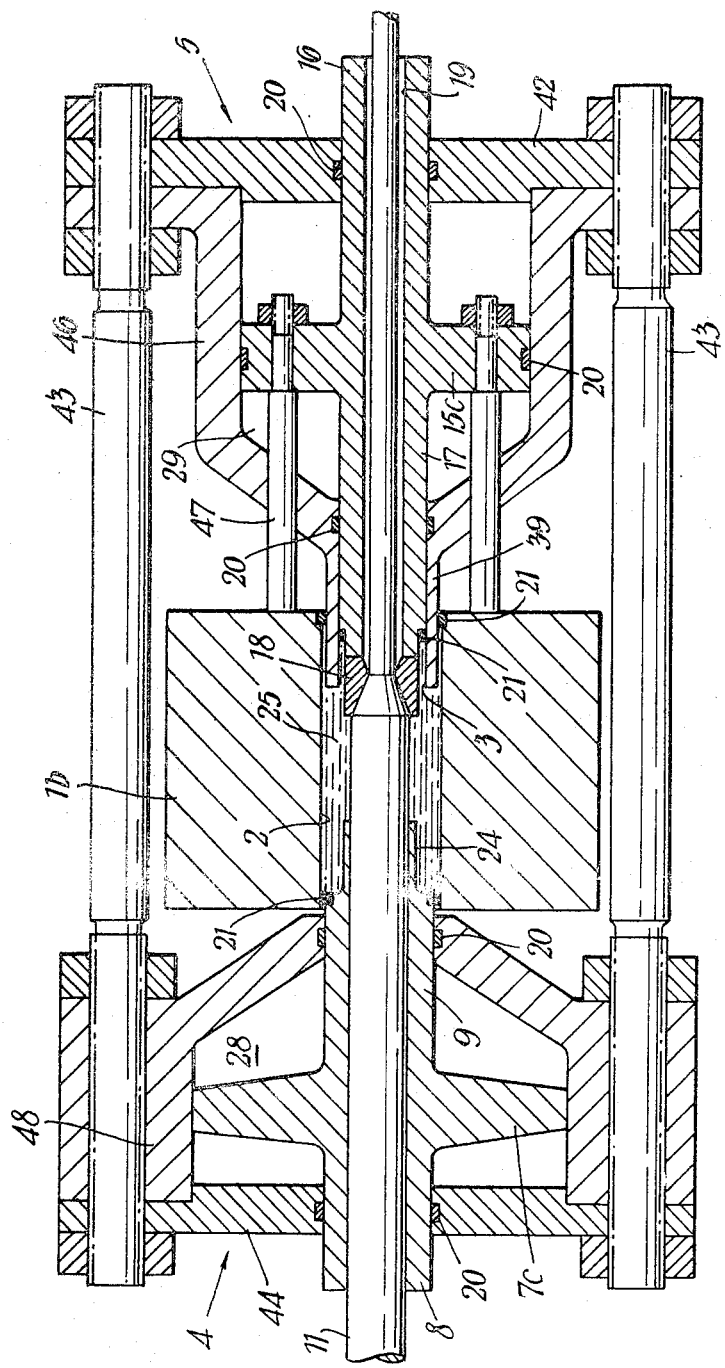

In order that the invention may be clearly understood and carried out, reference will now be made by way of example to the accompanying drawings in which:

FIG. 1 is a diagrammatic sectional view of a high pressure extrusion apparatus of the invention, FIG. 2 is a fragmentary sectional view showing an alternative arrangement of the apparatus of FIG. 1, FIG. 3 is a fragmentary sectional view to a larger scale of a detail of FIG. 1, FIG. 4 is a diagrammatic representation of a modified embodiment of FIG. 1, FIG. 5 is a sectional view of a second embodiment, FIG. 6 is a diagrammatic sectional view of a third embodiment and FIG. 7 is a diagrammatic sectional view of a fourth embodiment of the invention.

Referring now to the drawings, a high pressure extrusion apparatus of the invention is shown in one form in FIG. 1. It consists of a cylindrical high-pressure vessel 1, with concentric bores or chambers 2 and 3 of different diameters providing a stepped open ended axial bore through the vessel 1. The vessel may alternatively consist of two vessel parts 32 and 33, in axial alignment (see FIG. 2), of a single parallel bore vessel in which a suitable cylindrical sleeve has been inserted to reduce the effective diameter of part of the vessel, or of one or more vessel parts defining a part-conical or similarly tapered vessel bore therein.

Fixed in respective axial alignment with the bores 2 and 3 are two hydraulic intensifier assemblies 4 and 5. The intensifier assembly 4 comprises a cylindrical outer casing 6 with closed ends, in which is slidably mounted a piston 7 which has a relatively much smaller diameter rearwardly extending cylindrical portion 8 which projects through the outer closed end of the cylindrical casing 6. Projecting forwardly from the piston 7 is a cylindrical portion 9 which constitutes a high-pressure ram, and which engages with the larger bore 2 of the high-pressure vessel 1.

A parallel co-axial bore 10 which extends through the piston assembly 7 is of a diameter such as to be a close sliding fit on a billet or billets 11. The bore 10 may also accommodate the tip of a billet loading ram 12. Incorporated in the piston assembly 7 is clamping means 13 which can be actuated to prevent relative axial movement of the piston 7 and billet 11, or of the piston 7 and ram 12. The inner tip of the ram 9 is formed into an extended relatively thin cylindrical lip 24 which encloses the billet and serves to provide a seal by radial inward deflection against the billet sides under the action of pressure generated in hydrostatic pressure medium 25 contained in the bores 2 and 3.

A second hydraulic intensifier casing 14 is positioned co-axially opposite the open end of the smaller bore 3 of the vessel 1. Slidably mounted within the casing 14 is a further piston assembly 15 with axially extending portions 16 and 17. The portion 16 projects through the outer closed end 1 of the intensifier casing 14 and the portion 17 projects into the bore 3 of the high-pressure vessel 1.

The inner end of the ram portion 17 of the piston 15 is adapted to carry an extrusion die 18 while the entire piston assembly 15 has a concentric axial bore 19 therethrough of sufficient diameter to accommodate the largest extruded section that it is contemplated to extrude. Hydraulic seals are provided at 20 and high pressure seals at 21. Also a hydraulic connection 22 is provided between the intensifiers 4 and 5, together with a suitable hydraulic supply pump 23. Means may also be provided to allow removal of fluid from behind the pistons 7 and 15 to prevent trapping of the fluid. Also regions 28 and 29 lying respectively in front of the pistons 7 and 15 may be connected to hydraulic supply pumps not shown in FIG. 1, to effect retraction of the pistons 7 and 15 when required, or to assist in controlling the speed of travel of the pistons 7 and 15.

During operation, a long billet, or several short billets 11 are loaded into the bore 10 of the piston assembly 7, using the ram 12 to push the billets through the lip 24 into contact with the entrance side of the die 18. Simultaneously the piston 7 is retracted to the limit of its travel, the die supporting ram 17 is moved to a central starting position within the bore 3, and the bores 2 and 3 are charged with a suitable hydrostatic pressure medium 25. External auxiliary hydraulic cylinders (not shown) are conveniently used to retract the single-acting pistons 7 and 15. To this end two such auxiliary cylinders are attached to each piston, preferably by means of crossheads forming part of the respective pistons 7 and 15. These auxiliary cylinders can be made single or double acting, and if double-acting can be used to assist movement of the billet clamping ram 9 during extrusion.

The clamp 13 and the pump 23 are then actuated. Relative axial movement between the billet 11 and the ram 9 is prevented, whilst without deformation of the billet, relative movement between the die 18 and the ram 9 is also prevented. Thus the two piston assemblies 7 and 15, and the billet 11 all move towards the die end of the vessel 1, causing pressure to build up in the hydrostatic pressure medium 25 by virtue of the difference in the bore diameters 2 and 3. During this process, hydraulic fluid is exhausted from the intensifier 5 via the connection 22 to add to the discharge from the pump 23 into the intensifier 4.

If P is the pressure in the bores 2 and 3, $p_1$ and $p_2$ are pressures in the intensifiers 4 and 5, $A_1$ and $A_2$ the effective cross-section of the pistons 7 and 15 and $a_1$ and $a_2$ the effective cross-sectional areas of the rams 9 and 17 then since intensifiers 4 and 5 are connected via the connection 22

$$p_1 \backsimeq p_2 \qquad (i)$$

If it is assumed that the load exerted by the ram 9 on the billet 11 is just sufficient to balance the pressure reaction, then we find, for equilibrium that $$\frac{A_1}{A_2} = \frac{a_1}{a_2} \qquad (ii)$$

At the end of the compression stroke, the required extrusion pressure is reached, and the billet 11 begins to flow through the die 18. Under these circumstances the ram 9 retracts in the bore 2 while the ram 17 advances at a greater speed into the bore 3 to feed the billet 11 into the die 18. Eventually at the end of the extrusion stroke the lip 24 on the ram 9 abuts against the die entrance. At this point the hydraulic pump 23 is stopped and oil progressively vented from the intensifiers 5 and 4 via a valve 26. The residual pressure in the hydrostatic pressure medium 25 acting over the larger area of the ram 9 then causes both pistons 7 and 15 to move to the left with respect to FIG. 1. The ram 17 is kept pressed against the billet 11 by the residual hydraulic pressure in the intensifier 5 which by virtue of Equation ii is always just sufficient to overcome the outward force due to the pressure in the bore 3.

Finally the pressure in the medium 25 falls to a low value, and the piston 15 reaches the inward limit of its travel. The clamp 13 is then released and pressure applied by the billet loading ram 12 to prevent axial movement of the billets 11. The ram 9 of the piston 7 is withdrawn from the bore 2 to the limit of travel of the piston 7 and additional hydrostatic pressure medium 25 is supplied to the vessel as required to make up losses. This can be effected via suitable bores in the vessel 1, or by means of a sliding valve incorporated in a sleeve used to form the restricted bore 3, or by various other means.

The apparatus is then ready for a further extrusion cycle, which is initiated by closing the valve 26, actuating the clamp 13 and energising the pump 23 as before. It should be pointed out that during the previous extrusion cycle, when the clamp 13 was actuated, it would have been possible to retract the billet load ram 12 and insert further billets into the bore 10 as required, with no increase in the cycling time. Furthermore, a continuous billet could be extruded, by replacing the ram 12 by suitable feed rollers, or by gripping the billet in a spring-loaded taper collet or clamp that can be actuated axially by the feed ram 12.

Should it be required to extrude a short billet, possibly of a smaller diameter than the bore 10, a suitable extension 27 (FIG. 2) can be provided on the front of the billet loading ram 12a which would accommodate the billet 11 at its forward end, and have an outer cylindrical surface of the correct diameter to engage the clamp 13.

Furthermore a more powerful billet loading ram 12 capable alone of supporting the axial reaction from the billets during extrusion could be employed in place of the clamp 13. Alternatively the lip 24 only could be used as a clamp, actuated inwards by the pressure in the hydrostatic pressure medium 25, and automatically released as required when this pressure fell to a low value.

This latter arrangement is particularly suitable in very high pressure machines, since in this case the required axial stress in the billet 11 will be greater than its yield strength. This means that for very high pressure use the billet would tend to upset in the bore 10 if clamped by the clamp 13 and would exert a considerable bursting pressure on the bore 10. Although this would reduce the clamping force necessary at the clamp 13 by virtue of the intimate frictional contact between the bore 10 and the billet 11, the ram 9 would then need to be designed as a pressure vessel to support the bursting pressure. However, by using the lip 24 as a pressure actuated clamp this problem is averted, the length of billet between the lip clamp 24 and the clamp 13 being only lightly loaded. The clamp 13, which can be a simple spring-loaded split taper collet, is still required, however, to provide an initial force until the pressure in the vessel is sufficient to actuate the lip clamp 24.

In the event of it being required to partially extrude a billet, the discard or extrusion can be withdrawn from the die 18 by pressurising the regions 28 and 29 of the intensifiers (FIG. 1) before the clamp 13 is released, to pull the die 18 off the billet 11. The billet discard could then be withdrawn via the bore 10 after releasing the clamp 13. In this case the die 18 must be clamped in the end of the ram 17.

Alternatively a two-piece die can be used (FIG. 3) formed by an inner die portion 30 which is a close sliding fit in an outer die portion 31 which is housed in the ram 17 as before. At the end of an extrusion cycle, the intensifier regions 28, 29 could then be pressurized or the external auxiliary hydraulic cylinders actuated as previously explained and the billet 11 and inner die portion 30 withdrawn together from the outer die portion 31. The clamp 13 would then be released and the billet and die withdrawn as before through bore 10 for subsequent disassembly.

As hereinbefore described the vessel 1 may be constructed in two sections 32 and 33 (FIG. 2) with a static seal at 34. Having removed the billet 11 from the die by some suitable method such as hereinbefore described, acess to the bores 2 and 3 is obtained by axially separating the vessel parts 32 and 33 at the seal 34. The discard is then removed.

Although the apparatus of FIGS. 1 to 3 has been shown for example as employing two movable rams 9 and 17 in conjunction with a relatively fixed stepped-bore vessel 1 it is of course possible to make for example the ram 9 fixed, relative to a movable vessel and ram 17, as basically it is only necessary for at least one of the three major components (vessel 1 and rams 9 and 17) to be fixed relative to the others. Similarly although the clamp ram 9 has been shown of larger diameter than the die supporting ram 17 with the bore 2 of larger diameter than the bore 3, a converse arrangement is possible. By suitably choosing which one or two of the three major components of the apparatus is/are to move, and which ram and bore is of larger diameter, various permutations and combinations of the basic apparatus are possible.

A further modification of the first embodiment in which any or all of the previous features could be incorporated allows the apparatus to perform "augmented" hydrostatic extrusion. In this case the force applied by the ram 9 and the clamp 13 to the rear of the billet 11 is greater than that required to overcome the reaction due to the pressure generated in fluid 25, and not merely equal to it. The die reaction acting on the ram 17 is also greater than in the previous embodiment in which it is substantially equal to the product of the fluid pressure in the fluid 25 and the cross-sectional area of the ram 17 and incorporated extrusion.

The essential requirement for such augmented extrusion is that the force on the die-supporting ram 17 is increased relative to that on the other ram. To this end the auxiliary cylinders when available on both rams, can be used during extrusion to assist or hold off either or both rams, 9 and 17, thus adding to or subtracting from the total effective areas $A_1$ and $A_2$ (as hereinbefore defined) their own effective areas. Thus augmenting can be achieved (see Equation ii) by energising the auxiliary cylinders on ram 17 to assist it thereby increasing $A_2$ or by energising the auxiliary cylinders on ram 9 to hold it off thereby reducing $A_1$.

It is also possible to design the apparatus such that for no augmenting, the auxiliary cylinders on the ram 17 normally act *against* the piston 15, holding it off. Thus although the *net* area $A_2$ is then given by Equation ii the actual area of piston 15 is greater than this by an amount equal to the area of the hold-off cylinders.

Thus, further augmenting can be obtained by de-energising auxiliary hold-off cylinder(s) on the ram 9 to increase $A_2$, similarly the ram 9 can normally be *assisted* by its auxiliary cylinders. Augmenting can then be obtained by de-energising the auxiliary assisting cylinders on the ram 9 to decrease $A_1$. Evidently, any combination of the aforesaid augmenting procedures is also possible, giving various degrees of augmenting. Such techniques permit varying the amount of augmenting during a cycle.

Augmented hydrostatic extrusion is conveniently effected by employing the arrangement shown in FIG. 1 but with $A_2$ substantially greater than the value given by Equation ii. At the limit, when the augmenting pressure is large compared with the fluid pressure generated in the hydrostatic pressure medium 25, $A_1$ and $A_2$ are approximately equal. This arrangement requires permanent modification to the apparatus and a more flexible modified embodiment is shown diagrammatically in FIG. 4, which modified embodiment is capable of hydrostatic extrusion without any augmenting, or extrusion with various degrees of augmenting.

The modified apparatus of FIG. 4 is basically similar to that previously described and shown in FIG. 1 except that hydraulic connection between the intensifiers 4 and 5 is effected via a "pressure transformer" 35 which acts to maintain a constant predetermined ratio between the pressures $p_1$ and $p_2$ in the intensifiers 4 and 5 (see FIG. 4).

Thus the relation (Equation ii) between $A_1$ and $A_2$ during normal hydrostatic extrusion becomes:

$$\frac{p_1 A_1}{a_1} = \frac{p_2 A_2}{a_2}$$

or $$\frac{A_1}{A_2} = \frac{a_1 p_2}{a_2 p_1} \qquad (iii)$$

so that the intensifier and ram diameters may be freely chosen according to the available pressure ratio from the pressure transformer 35. In order to change to augmented extrusion it is only necessary to change the ratio $(p_2/p_1)$. This can be done during operation of the apparatus as necessary. In extruding a complex component, such change might be required several times during each extrusion cycle.

The pressure transformer 35 is conveniently in the form of two variable delivery hydraulic swash-plate pumps/motors 36 and 37, mechanically connected so that the oil exhausted from the intensifier 5 into the pump 37 drives it as a hydraulic motor, transmitting power via a shaft 38 to the pump 36 which delivers oil to the intensifier 6 at the required pressure $p_1$. The swash-plate angle of the pumps 36 and 37 can be automatically controlled to maintain the ratio $p_1/p_2$ at the present value.

An essential feature is that the apparatus of the invention consists of three major assemblies, namely, the two piston assemblies 7 and 15 and the assembly shown as static in FIG. 1 consisting of the vessel 1 and the two intensifier casings 6 and 14. Only relative motion of these three assemblies is required during operation of the apparatus so it is possible to fix in position any one of them as proves most convenient for particular applications.

In this way by permutating the components that are fixed in position (the vessel assembly in FIG. 1) various other configurations may be obtained. On such configuration is shown in the second embodiment of FIG. 5, in which a billet clamping piston assembly 7a has been made fixed. Components common to FIG. 1 and FIG. 5 are similarly referenced. By incorporating a sliding sleeve 39 (FIG. 5) inside a vessel 1a which has a parallel bore 2 as previously suggested, so that the smaller bore 3 constitutes the inner surface of the sleeve, it is also possible to fix the vessel 1a. The previously required axial movement of the vessel 1 is replaced by axial movement of the sleeve 39 actuated by an annular piston 40 which also constitutes the cylinder in which a die-supporting piston assembly 15a slides. The annular piston 40 slides in a further intensifier body 41 which has a closed end 42 which is rigidly connected to the fixed piston assembly 7a via tie-rods 43 and a platen 44.

During extrusion, with or without augmenting, the required ratio of axial forces acting respectively on the ram 17 and the annular sleeve 39 is obtained by maintaining the ratio of pressures in the intensifier 5 and intensifier region 29. This can be accomplished as before by use of a pressure transformer 35 in conjunction with the hydraulic supply pump 23.

In the embodiment of FIG. 5 in which the vessel 1a is permanently fixed against the billet clamping ram part 9a of the fixed assembly 7a, movement of the sliding sleeve 39 can be considered as equivalent to movement of the vessel as previously described. This is because the position of the annular end of the sleeve in the bore 2 corresponds to the position of the step in the stepped bore vessels. Furthermore although in the embodiment of FIG. 5 the sleeve 39 has been shown associated with and surrounding the die supporting ram 17 it is possible in alternative forms of the embodiment for the sleeve to be associated with and surrounding the billet clamping ram. This in turn means that although the die supporting ram 17 has been shown in the example of FIG. 5 as being of smaller diameter than the billet clamping ram 9a the converse is also possible, in which case the smaller diameter bore 3 would house the billet clamping ram. Thus by suitably choosing which of the rams is/are relatively movable, and which ram is associated with the movable sliding sleeve, various other arrangements of the basic apparatus are possible.

It is possible in the arrangement where the billet clamping ram is movable in the movable sliding sleeve 39 relative to a fixed die ram 17 and fixed vessel 1 for the sleeve at some stage during the operative cycle of the apparatus to be subjected to either an external or an internal pressure over part of its length. Such pressure is then not balanced by an equal internal or external pressure as the case may be. This state of affairs is undesirable for very high pressure applications and the embodiment of FIG. 6 is designed to obviate such a possibility. The embodiment of FIG. 6 is similar to that of FIG. 5 and components common to FIGS. 5 and 6 are similarly referenced. In this third embodiment internal and external seals 21 sliding on the annular sleeve 39 are always radially opposite each other so that there is no unbalanced radial pressure on the sleeve. This is effected by making the vessel 1b move together with the ram projecting through the sleeve, which in this example is the die supporting ram 17.

The sleeve 39 is actuated by an annular piston 40 sliding in a cylindrical extension 41a which has a closed end constituting the piston 15b. The cylindrical extension 41a, terminates in a cross-head 41b and the vessel 1b is connected to the piston 15b by means of, for example, two or more connecting rods 41c secured between the cross-head 41b and the vessel 1. These connecting rods 41c preferably are constituted by ram parts of auxiliary hydraulic ram and cylinder assemblies connected between the vessel 1b and the cross-head 41b, which ram and cylinder parts may be locked against relative movement during an extrusion operation on the apparatus to cause the vessel 1b and the die supporting ram 17, to which the piston 15b is directly connected, to move together as one unit. Before or after an extrusion operation, the ram and cylinder assemblies may be used to displace the vessel 1b relative to the die supporting ram 17, in order to move the vessel away from the die 18 or billet clamping lip 24 to afford access thereto. The piston 15b and its cylindrical extension 41a are slidably housed in the intensifier body 41 which has a closed end 42a rigidly connected to the fixed piston assembly 7b via tie-rods 43 and the platen 44.

In this embodiment the billet feed ram 12 (FIG. 1) is replaced by feed rollers 45 for enabling a continuous billet 11 to be extruded. External auxiliary hydraulic cylinders (not shown) are conveniently used to retract the sliding sleeve 39 and the die supporting ram 17. Hydrostatic pressure medium may be supplied to the vessel bore by means of a sliding valve incorporated in the sleeve 39.

The operation of the apparatus of FIG. 6 is as follows:

After the completion of an extrusion the sleeve 39 is retracted to depressurise the vessel and thereby release the clamp lip 24 from the billet 11. Then the ram 17 is retracted together with the vessel 1b and the billet 11 is simultaneously fed into the vessel bore 2 as required. The sleeve 39 is then advanced into the bore 2 to pressurise the pressure medium therein so as to actuate the clamp lip 24 against the billet 11. When extrusion pressure is reached, pressurising the intensifier 5 further causes the ram 17 to advance, thus feeding the die 18 on to the billet 11. At the same time the sleeve 39 will retract. When the die 18 abuts against the end of the lip 24, extrusion is complete and the cycle recommences. If it is necessary at the end of a cycle to re-charge pressure medium into the vessel, the vessel 1b is displaced to the right with reference to FIG. 6 until it runs off the sealing surface of the ram 9. Hydrostatic pressure medium is then admitted from an annulus outside the vessel. The sleeve 39 is then correctly re-positioned to allow the required make-up of medium into the vessel bore and the vessel is returned. During initial charging of the vessel the sleeve 39 and ram 17 may also be retracted to clear the vessel and allow air to be expelled from the bore 2 at the right hand bore seal 21 as shown on FIG. 6.

In the third embodiment, during the compression stroke, the sleeve 39 is retarded by frictional forces on both inner and outer surfaces thereof. Since the vessel is connected to the ram 17 both these friction forces act to try to drag the ram 17 inwards. Thus if the areas are in accordance with Equation ii, the fluid pressure generated by the sleeve 39 will be much less than that expected from the hydraulic supply pressure, while the inward force on the die will be much greater. This will give considerable augmenting, although none would be expected from Equation ii.

Once extrusion is underway, the sleeve 39 retracts and is subjected to two inward frictional drags, which in turn retard ram 17 (which is also retarded by seal friction due to connection with vessel 1b). Thus, the fluid pressure required to drive the sleeve 39 back will be greater than expected, while the net inwards force on ram 17 will be less. This will give negative augmenting, and tend to cause separation between the billet and die. During the phase between these two, as extrusion is beginning, there will be a hybrid phase when the sleeve 39 and the ram 17 "stick" together, and the fluid pressure rises.

All these effects can be overcome by using the auxiliary cylinders on the sleeve 39 and the ram 17 to set off the friction forces. Augmenting on the apparatus is effected by de-energising the auxiliary hold-off cylinders on the ram 9 to increase $A_2$. The return cylinders on ram 17 are normally held off by exhausting through a relief valve as the ram 17 advances. By varying the relief pressure the amount of augmenting is continuously adjustable.

Further forms of the apparatus are obtainable in which the sleeve 28 is fixed relative to a movable vessel 1b and movable rams 9 and 17. One such form is shown diagrammatically in FIG. 7 in which components common to FIGS. 5 and 6 have similar reference numerals. In FIG. 7 the sleeve 39 surrounds the die supporting ram 17 and is fixed to the platen 42 via a cylindrical part 46 in which the piston 15c is housed. The vessel 1b is fixedly connected to the piston 15c for movement therewith, by tiebars 47 passing through apertures provided in the forward end of the cylindrical part 46. The billet clamping ram 9 is also movable and its piston 7c is slidably housed in a cylinder part 48 fixedly secured to the platen 44. Operation of this apparatus is similar to the previous embodiments, and again in this case there is no unbalanced radial pressure acting on the sleeve 39. By suitably choosing which ram passes through the sleeve and which ram the vessel moves with, other variants on the example of FIG. 7 are obtainable for a relatively fixed sleeve 39.

We claim:

1. A high pressure extrusion apparatus for hydrostatic or semi-hydrostatic extrusion purposes, said apparatus incorporating a first component in the form of a pressure vessel having an open ended axial bore therethrough defining at least one extrusion chamber adapted to contain hydrostatic medium, a second component in the form of a first axially bored ram assembly arranged for coaxial projection into said extrusion chamber through one open bore end of the pressure vessel and from which a billet of material to be extruded can be caused to project into said extrusion chamber, said first ram assembly including clamping means selectively actuable to prevent relative axial movement between the first ram assembly and the billet projected as aforesaid, a third component in the form of a second axially bored ram assembly adapted to carry an extrusion die and arranged to project coaxially into said extrusion chamber through the other open end of the pressure vessel, at least one of said three components being axially movable in relation to the other two said components, two differential pressure means operative in the direction of the vessel bore axis to effect said relative axial component movement and generate a controlled extrusion pressure in hydrostatic medium surrounding a billet part when projected into the extrusion chamber as aforesaid, and a source of hydrostatic medium for operating said two differential pressure means independently of the hydrostatic medium in said extrusion chamber.

2. A high pressure extrusion apparatus according to claim 1, further incorporating an annular step within the bore of said pressure vessel between two communicating co-axial bore parts of which one bore part has a greater diameter than the other bore part, one of said ram assemblies having an outer diameter corresponding to the larger diameter bore part, the other said ram assembly having an outer diameter corresponding to the smaller diameter bore part and any two of the apparatus components consisting respectively of said first ram assembly, said second ram assembly and said vessel being arranged for axial movement during operation while the other said component remains fixed, to generate said extrusion pressure.

3. A high pressure extrusion apparatus according to claim 2 in which said pressure vessel comprises two open ended axially bored sections connected in aligned end to end relationship, the bore of one section being of larger diameter than the bore of the other said section, to form said stepped bore.

4. A high pressure extrusion apparatus according to claim 3, in which said differential pressure means are in the form of differential-area piston and cylinder pressure intensifier assemblies operable to axially displace said movable components.

5. A high pressure extrusion apparatus according to claim 1 further including a sleeve member inserted into part of said axial bore sleeve member to reduce the diameter thereof, one of said two ram assemblies being adapted for projection into said vessel bore through said sleeve member, and at least one of the four components consisting respectively of said first ram assembly, said second ram assembly, said sleeve member and said vessel being fixed in position with respect to the other said components, of which at least two are axially movable relative to said fixed component, to generate said extrusion pressure.

6. A high pressure extrusion apparatus according to claim 5 in which means is provided to move the pressure vessel axially and substantially in synchronism with said ram assembly projecting through said sleeve member, and said sleeve member is said fixed component.

7. A high pressure extrusion apparatus according to claim 6, in which said differential pressure means are in the form of differential-area piston and cylinder pressure intensifier assemblies operable to axially displace said movable components.

8. A high pressure extrusion apparatus according to claim 1 in which said billet clamping means of said first ram assembly includes an extended relatively thin cylindrical lip formed on the inner tip of said first ram assembly, which lip forms a pressure actuable seal around a billet when projected through said first ram assembly into said extrusion chamber.

9. A high pressure extrusion apparatus according to claim 1 in which said extrusion die comprises an inner die portion and an outer die portion, said inner die portion being fitted slidably in the outer die portion which is secured to the inner tip of the second ram assembly.

References Cited

UNITED STATES PATENTS

| 3,306,089 | 2/1967 | Brayman | 72—60 |
| 3,344,636 | 10/1967 | Pugh | 72—60 |
| 3,382,691 | 5/1968 | Green | 72—60 |
| 3,423,983 | 1/1969 | Lees et al. | 72—60 |
| 3,434,320 | 3/1969 | Green | 72—60 |

RICHARD J. HERBST, Primary Examiner

U.S. Cl. X.R.

72—270